(12) United States Patent
Choi et al.

(10) Patent No.: US 7,162,807 B2
(45) Date of Patent: Jan. 16, 2007

(54) GEOMAGNETIC SENSOR HAVING A DIP ANGLE DETECTION FUNCTION AND DIP ANGLE DETECTION METHOD THEREFOR

(75) Inventors: Sang-on Choi, Suwon-si (KR); Woo-jong Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 154 days.

(21) Appl. No.: 10/923,898

(22) Filed: Aug. 24, 2004

(65) Prior Publication Data

US 2005/0044737 A1    Mar. 3, 2005

(30) Foreign Application Priority Data

Aug. 27, 2003    (KR)    ...... 10-2003-0059634

(51) Int. Cl.
    *G01C 17/38*    (2006.01)
(52) U.S. Cl. ............... 33/356; 33/1 E; 702/92
(58) Field of Classification Search ......... 33/356, 33/366, 355 R, 1 E, 366.11–366.14, 366.23, 33/366.25, 366.26, 366.27; 702/92, 93
See application file for complete search history.

(56) References Cited

U.S. PATENT DOCUMENTS

| | | | | |
|---|---|---|---|---|
| 3,935,642 A | * | 2/1976 | Russell | ............... 33/302 |
| 3,938,257 A | * | 2/1976 | Erspamer | ............... 33/361 |
| 4,668,100 A | * | 5/1987 | Murakami et al. | ........ 368/10 |
| 4,918,824 A | | 4/1990 | Farrar | |
| 5,187,872 A | * | 2/1993 | Dufour | ............... 33/356 |
| 5,953,683 A | * | 9/1999 | Hansen et al. | ............ 702/95 |
| 6,606,799 B1 | * | 8/2003 | Kato | ............... 33/356 |
| 6,836,971 B1 | * | 1/2005 | Wan | ............... 33/356 |
| 6,957,156 B1 | * | 10/2005 | Jo et al. | ............... 702/51 |
| 7,086,164 B1 | * | 8/2006 | Satoh et al. | ............... 33/316 |
| 2002/0056202 A1 | | 5/2002 | Tamura | |
| 2002/0100178 A1 | * | 8/2002 | Smith et al. | ............ 33/356 |
| 2004/0172838 A1 | * | 9/2004 | Satoh et al. | ............ 33/316 |
| 2005/0114076 A1 | * | 5/2005 | Lee | ............... 702/151 |
| 2005/0183274 A1 | * | 8/2005 | Cho et al. | ............ 33/356 |
| 2005/0188556 A1 | * | 9/2005 | Lee et al. | ............ 33/356 |
| 2005/0190281 A1 | * | 9/2005 | Lee et al. | .......... 348/333.12 |

FOREIGN PATENT DOCUMENTS

KR    2002-0030244 A    4/2002

* cited by examiner

*Primary Examiner*—G. Bradley Bennett
*Assistant Examiner*—Amy R. Cohen
(74) *Attorney, Agent, or Firm*—Sughrue Mion, PLLC

(57) ABSTRACT

A geomagnetic sensor supporting a dip angle detection function. The geomagnetic sensor includes a rotation angle measurement part for measuring pitch and roll angles of the main body with respect to the surface of the Earth; a geomagnetic measurement module for outputting an electric signal corresponding to the geomagnetic field; a memory for storing predetermined reference azimuths and output values of the geomagnetic measurement module corresponding to changes of the pitch and roll angles; and a controller for calculating azimuths by use of the output values of the geomagnetic measurement module, the pitch and roll angles, and predetermined dip angles. The controller establishes at least two dip angles, calculates the azimuth for each dip angle, compares the azimuth to the reference azimuth, and determines a dip angle at the azimuth having a smaller azimuth error as a current dip angle. The geomagnetic sensor can measure a precise dip angle using a simple method.

18 Claims, 6 Drawing Sheets

GEOMAGNETIC SENSOR HAVING A DIP ANGLE DETECTION FUNCTION AND DIP ANGLE DETECTION METHOD THEREFOR

This application claims benefit under 35 U.S.C. § 119 from Korean Patent Application No. 2003-59634, filed on Aug. 27, 2003, the entire content of which is incorporated herein by reference.

BACKGROUND OF THE INVENTION

1. Field of the Invention:

The present invention relates to a geomagnetic sensor having a dip angle detection function and a dip angle detection method therefor, and more particularly, to a geomagnetic sensor having a two-axis fluxgate sensor and which is for detecting a current dip angle and a dip angle detection method therefor.

2. Description of the Related Art

A geomagnetic sensor is a device that measures the intensity and orientation of the geomagnetism that human beings cannot feel, and, in particular, a geomagnetic sensor using fluxgates is referred to as a fluxgate-type geomagnetic sensor.

That is, a fluxgate-type geomagnetic sensor refers to a device using a magnetic core of high-permeability material, such as permalloy, that measures the magnitude and direction of an external magnetic field by applying an excited magnetic field by use of a driving coil and measuring a secondary harmonic component proportional to the external magnetic field by use of the magnetic saturation and nonlinear magnetic characteristics of the magnetic core.

Such a fluxgate-type geomagnetic sensor was developed in the late 1930s, and has an advantage of good sensitivity, reasonable price, and relatively small size, compared to the other types of geomagneticsensors. Further, the fluxgate-type geomagnetic sensor has another advantage of low power consumption and long-term stability of output signals, so it is most widely used for general industries and military equipment, ranging from detection of weak magnetic field and measurement of the absolute orientation of the Earth for ore exploitation, target detection, artificial satellite posture control, and space probe, and one continues to carry out research on improvements to its performance.

In particular, as Micro Electro-Mechanical system (MEMS) technologies are being gradually developed, there is a desire to develop low power consumption-type miniature fluxgate sensors by using the technologies.

FIG. 1 is a block diagram schematically showing a general structure of such a geomagnetic sensor. In FIG. 1, a geomagnetic sensor 200 has a driving signal generator 110, a two-axis fluxgate sensor 120, a signal processor 130, a controller 140, a memory 150, and a rotation angle measurement part 160.

The driving signal generator 110 applies an electric signal enabling the two-axis fluxgate sensor 120 to be driven. Such an electric signal are pulse waves or converted pulse waves.

Further, the two-axis fluxgate sensor 120 includes two fluxgates perpendicular to each other. Further, each fluxgate has a magnetic core in a rectangular ring or a bar shape, and a driving and a detection coil wound around the magnetic core. The driving coil receives an electric signal outputted from the driving signal generator 110 and excites the magnetic core, and the detection coil detects electromotive force induced by a magnetic field generated by the activation of the driving coil.

On the other hand, if the detection coil detects a voltage proportional to the intensity of an external magnetic field, the signal processor 130 deals with the voltage in a series of processes such as amplification, chopping, and so on, and outputs corresponding voltages to the respective axes.

The rotation angle measurement part 160 measures the gravitational acceleration of the geomagnetic sensor 200 to calculate a pitch angle and a roll angle. The rotation angle measurement part 160 can be implemented with two acceleration sensors perpendicular to each other, such as a two-axis fluxgate sensor 120. The pitch angle refers to a rotation angle measured in case of rotating one of two perpendicular axes with respect to the other axis wherein the two axes are perpendicular to each other with respect to the center of the geomagnetic sensor 200 on the plane on which the geomagnetic sensor is placed. The roll angle refers to a rotation angle measured in case of rotation with respect to the other axis In general, the rotation angle measurement part 160 having a weight of certain mass enables one to visually or electrically check the movement of the weight due to gravity through an angle gauge, ruler, or indication needle so that the pitch and roll angles can be measured. The pitch and roll angles measured by the rotation angle measurement part 160 are stored in the memory 150.

Further, the controller 140 controls the normalization of the X-axis and Y-axis output voltages of the signal processor 130, the calculations of the azimuth of the geomagnetic sensor 200 by use of the pitch angle, roll angle, and current dip angle that have been measured by the rotation angle measurement part 160, and the indication of the azimuth. The dip angle is one of the three components (deflection angle, dip angle, and horizontal component) of the geomagnetic field, and refers to an angle formed between a magnetic needle and a horizontal plane when leaving the magnetic needle freely rotating vertical to the horizontal plane. The Republic of Korea has the dip angle of about 50° to 60°.

In related art devices, the azimuth is calculated with an input of a constant set for a dip angle value depending upon an area or with an input of the dip angle value from an external device such as the GPS. However, the use of dip angle values set depending upon areas causes problems of inputting a compensated value for a different area and of using an erroneous dip angle under environments in which the intensity of the geomagnetic field is varying even in the same area. Further, in case of inputting a dip angle from an external device such as GPS, more devices are needed for communicating with the external device, which causes a problem of increasing the size and manufacturing cost of a geomagnetic sensor.

SUMMARY OF THE INVENTION

The present invention has been developed in order to solve the above drawbacks and other problems associated with the conventional arrangement. An aspect of the present invention is to provide a geomagnetic sensor and method for precisely detecting a dip angle and calculating azimuth.

The foregoing and other objects and advantages are substantially realized by providing a geomagnetic sensor comprising a main body; a rotation angle measurement part for measuring pitch and roll angles of the main body with respect to the surface of the Earth; a geomagnetic measurement module for outputting an electric signal corresponding to the geomagnetic field; a memory for storing predetermined reference azimuths and output values of the geomagnetic measurement module corresponding to changes of the pitch and roll angles; and a controller for calculating azimuths by use of the output values of the geomagnetic measurement module, the pitch and roll angles, and predetermined dip angles. In accordance with the invention, the controller establishes at least two dip angles, calculates the azimuth for each dip angle, compares the azimuth to the reference azimuth, and determines a dip angle at the azimuth having a smaller azimuth error as a current dip angle.

According to one exemplary embodiment, the controller estimates as a reference dip angle a middle value of a pitch angle variation range in case that the pitch angle varies, estimates as a comparison dip angle a middle value between the reference dip angle and one of maximum and minimum values of the pitch angle variation range, and determines as the current dip angle either the reference dip angle or the comparison dip angle based on which azimuth having a smaller azimuth error is calculated.

According to another exemplary embodiment, the controller re-estimates the current dip angle as a second reference dip angle if azimuth calculated based on the current dip angle has an azimuth error beyond a certain error range, re-estimates as a second comparison dip angle a middle value of the second reference dip angle and either the reference dip angle or the comparison dip angle that is not determined as the current dip angle, and repeats a process as above. Thus, if within the certain error range, the dip angle at the time is finally determined as the current dip angle.

According to another exemplary embodiment, the rotation angle measurement part includes X-axis and Y-axis acceleration sensors perpendicular to each other. In particular, the controller normalizes voltage values measured by the X-axis and Y-axis acceleration sensors into values in a certain range, and calculates the pitch and roll angles by use of predetermined equations.

Further, the geomagnetic measurement module can be a two-axis fluxgate sensor having X-axis and Y-axis fluxgates perpendicular to each other and outputting an electric signal of each of the X-axis and Y-axis fluxgates corresponding to a magnetic field generated by a certain driving signal.

According to another embodiment, the geomagnetic sensor further comprises a driving signal generation part for generating and applying the driving signal to the geomagnetic measurement module; and a signal processing part for converting the electric signals of the geomagnetic measurement module into voltage values of the X-axis and Y-axis fluxgates for outputs.

In particular, the controller measures the voltage values of the X-axis and Y-axis fluxgates every time the pitch angle increases if the geomagnetic sensor rotates in order for the pitch angle to increase by a certain angle in a certain range at a fixed roll angle, normalize the voltage values into values in a certain range, and stores the normalized voltage values in the memory.

The controller calculates a voltage value of a virtual Z-axis fluxgate perpendicular to a plane formed by the X-axis and Y-axis fluxgates by use of predetermined equations, and calculates azimuth by using the voltage value of the Z-axis fluxgate.

According to another embodiment of the present invention, the geomagnetic sensor further comprises an alarm part for displaying a predetermined dip angle checkup message. Specifically, the controller checks the voltage values of the X-axis and Y-axis fluxgates measured in a horizontal state, compares the voltage values to a predetermined reference voltage value stored in the memory, checks the number of times that an error to the reference voltage value exceeds a predetermined limit error range, and controls the alarm part to display the dip angle checkup message if the number of times of excess is more than the predetermined number of times.

The foregoing and other objects and advantages are substantially realized by providing a dip angle detection method for a geomagnetic sensor, comprising (a) measuring pitch and roll angles of the geomagnetic sensor with respect to the surface of the Earth; (b) detecting output values corresponding to a geomagnetic field from X-axis and Y-axis fluxgates perpendicular to each other; (c) establishing at least two dip angles; (d) calculating azimuth corresponding to each of the at least two dip angles by use of the output values and pitch and roll angles; and (e) comparing a reference azimuth to the azimuth calculated at each of the at least two dip angles, and determining as a current dip angle a dip angle corresponding to the azimuth having a smaller azimuth error with respect to the reference azimuth.

According to an exemplary embodiment, step (c) includes establishing, as a reference, dip angle a middle value of a pitch angle variation range in case that the pitch angle varies; and establishing as a comparison dip angle a middle value between the reference dip angle and one of maximum and minimum values of the pitch angle variation range.

According to another exemplary embodiment, step (e) determines as the current dip angle either the reference dip angle or the comparison dip angle based on which azimuth has a smaller azimuth error with respect to the reference azimuth.

According to yet another exemplary embodiment, the dip angle detection method further comprises checking if azimuth calculated based on the current dip angle has an azimuth error beyond a certain error range; re-estimating the current dip angle as a second reference dip angle if the azimuth error is beyond the certain error range, and re-estimating as a second comparison dip angle a middle value of the second reference dip angle and either the reference dip angle or the comparison dip angle that is not determined as the current dip angle, and repeating steps (c) to (e).

Further, step (a) includes (a1) normalizing voltage values measured by X-axis and Y-axis fluxgates perpendicular to each other into values in a certain range, and (a2) calculating the pitch and roll angles by use of the normalized voltage values and predetermined equations.

According to an exemplary embodiment, step (b) includes applying a predetermined driving signal to the X-axis and Y-axis fluxgates; detecting electric signals of the X-axis and Y-axis fluxgates corresponding to a magnetic field generated by the driving signal; and converting the electric signals into voltage values of the X-axis and Y-axis fluxgates for outputs.

Further, the dip angle detection method further comprises rotating the geomagnetic sensor in order for the pitch angle to increase by a certain angle in a certain range at a fixed roll angle; measuring the voltage values of the X-axis and Y-axis fluxgates every time the pitch angle increases, and normalizing the voltage values into values in a certain range; and storing the normalized voltage values of the X-axis and Y-axis fluxgates.

Further, step (b) normalizes into values in a certain range a voltage value of a virtual Z-axis fluxgate perpendicular to a plane formed by the X-axis and Y-axis fluxgates by use of a predetermined equation, and calculates azimuth.

According to another exemplary embodiment, the dip angle detection method further comprises checking the voltage values of the X-axis and Y-axis fluxgates measured in a horizontal state; comparing the voltage values to a predetermined reference voltage value; checking the number of times that a comparison error to the reference voltage value exceeds a predetermined limit error range; and displaying a predetermined dip angle checkup message notifying that the current dip angle is in error if the number of times out of the limit error range is more than the predetermined number of times.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Hereinafter, the present invention will be described in detail with reference to the accompanying drawings.

Figure 1:
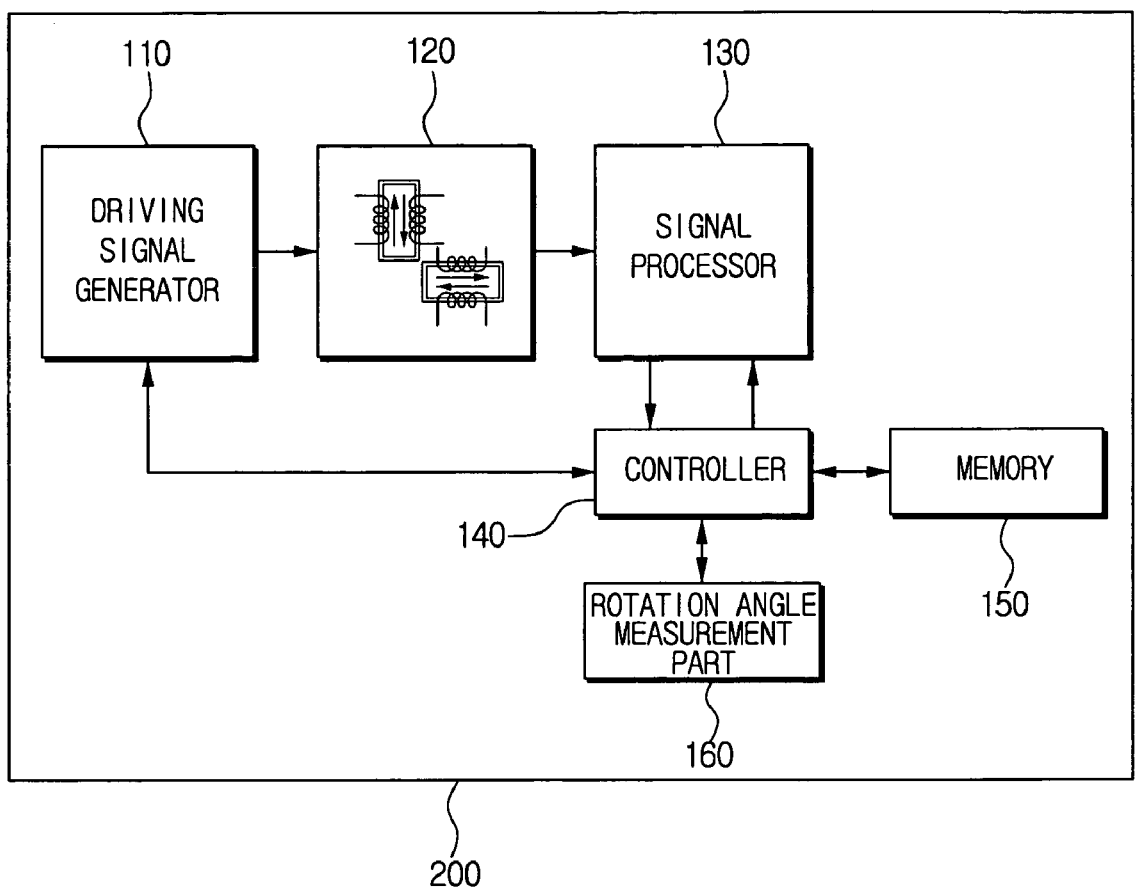
FIG. 1 is a block diagram for schematically showing a general structure of a geomagnetic sensor.
Figure 2:
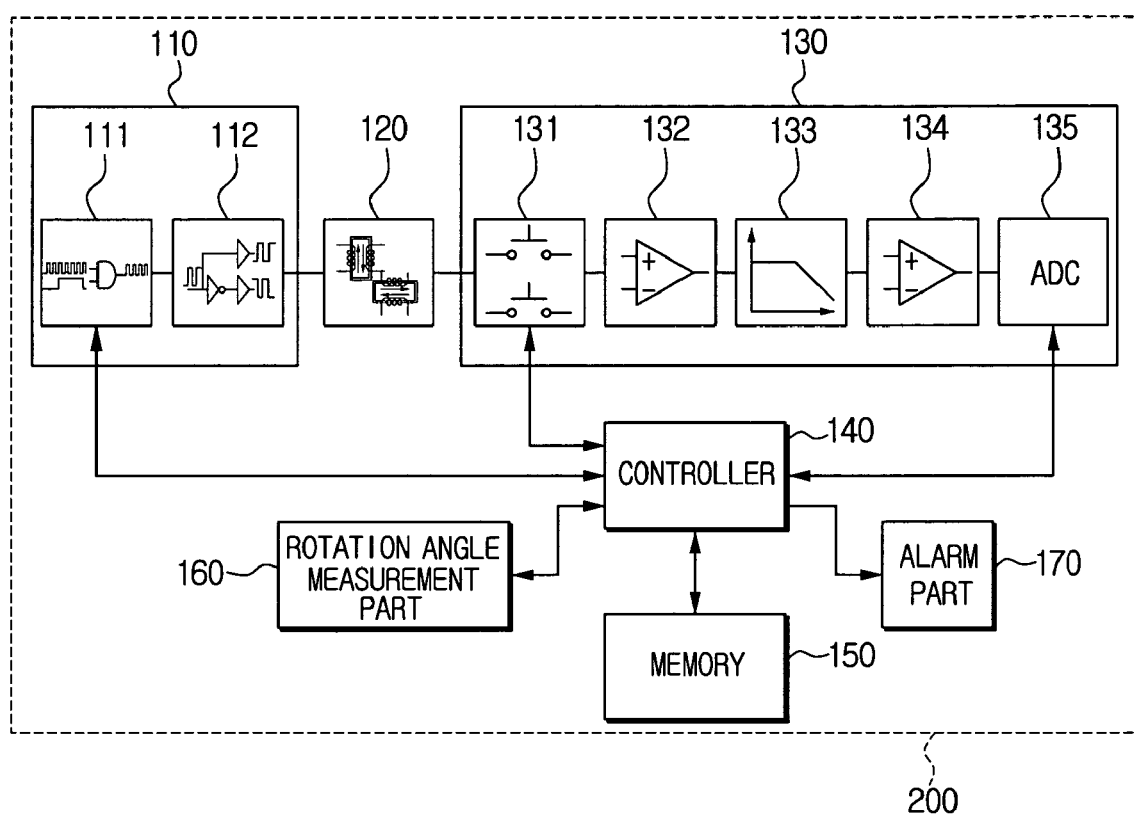
FIG. 2 is a block diagram for schematically showing a structure of a geomagnetic sensor according to one embodiment of the present invention.

FIG. 2 is a block diagram for schematically showing a structure of a geomagnetic sensor according to an embodiment of the present invention. In FIG. 2, the geomagnetic sensor 200 has a driving signal generator 110, a geomagnetic field detection module 120, a signal processing part 130, a controller 140, a memory 150, a rotation angle measurement part 160, and an alarm part 170.

The driving signal generation part 110 generates and outputs a driving signal for driving the geomagnetic field detection module 120. In general, pulse waves or reversed pulse waves can be used for the driving signal. That is, the driving signal generation part 110 includes a pulse generator (not shown), a pulse limiter 111, and a pulse amplifier 112, the pulses generated and outputted from the pulse generator are selectively switched by the pulse limiter 111 according to a control signal, and the selected pulses are amplified or reversed and amplified for outputs by the pulse amplifier 112.

The pulse limiter 111 uses AND gates, and outputs the pulses of the pulse generator according to a control signal applied to one end of the AND gates.

The pulse amplifier 112 uses plural amplifiers and converters, and outputs two pulse signals in opposite phase to each other as the pulses of the pulse limiter 111 are inputted.

The geomagnetic field detection module 120 includes X-axis and Y-axis fluxgates perpendicular to each other. The geomagnetic field detection module 120 is driven by a pulse signal and a converted pulse signal that are respectively sent to the X-axis and Y-axis fluxgates from the driving signal generation part 110, and outputs a detection signal corresponding to an electromotive force produced due to such driving. In FIG. 2, the X-axis and Y-axis fluxgates are longitudinally mounted in two directions of X and Y axes in which two rectangular ring-shaped magnetic cores are perpendicular to each other, and each magnetic core is wound with a driving coil and a detection coil. If a driving pulse is applied to the driving coil, a magnetic field is generated in the X-axis and Y-axis fluxgates, so induced electromotive force can be detected through the detection coil.

Further, the signal processing part 130 converts such an induced electromotive force into voltage values of the X-axis and Y-axis fluxgates through a predetermined process. In detail, the signal processing part 130 includes a chopping circuit 131, a first amplifier 132, a filter 133, a second amplifier 134, and an A/D converter 135.

An electric signal outputted from the geomagnetic field detection module 120 and induced in the X-axis and Y-axis fluxgates controls plural switches built in the chopping circuit 131 for signal chopping.

The chopped electric signal is differential-amplified in the first amplifier 132, filtered by the filter 133 into only a signal in a certain range, and finally amplified in the second amplifier 134. The amplified signal is converted into a voltage value by the A/D converter for an output.

Further, the rotation angle measurement part 160 includes an X-axis acceleration sensor mounted in the X-axis direction and a Y-axis acceleration sensor mounted in the Y-axis direction on an xy plane when the three-dimensional space is expressed in X, Y, and Z axes, normalizes voltage values measured by the respective axis acceleration sensors, and calculates the pitch and roll angles. The pitch and roll angles have been described as above.

Gravitational acceleration has different influences on an object or a device depending on its posture, and the rotation angle measurement part 160 is an acceleration sensor measuring the gravitational acceleration of such an object, and, if the rotation angle measurement part 160 is placed on a slanted surface, the built-in acceleration sensor detects a gravitational acceleration component corresponding to a detection direction of the acceleration sensor.

In order to measure the pitch and roll angles, the rotation angle measurement part 160 carries out a normalization process for mapping the output values of the X-axis and Y-axis acceleration sensors into output values in a certain range. The normalization process is carried out in Equation 1 as follows:

$$Xt_{norm} = \frac{2Xt - (Xt_{max} + Xt_{min})}{Xt_{max} - Xt_{min}} \quad \text{[Equation 1]}$$

$$Yt_{norm} = \frac{2Yt - (Yt_{max} + Yt_{min})}{Yt_{max} - Yt_{min}},$$

where, Xt denotes an output value of the X-axis acceleration sensor, Yt denotes an output value of the Y-axis acceleration sensor, $Xt_{norm}$ denotes a normalized output value of the X-axis acceleration sensor, and $Yt_{norm}$ denotes a normalized output value of the Y-axis acceleration sensor.

The pitch angle ($\theta$) and roll angle ($\Phi$) can be measured based on such normalized output values of the X-axis and Y-axis acceleration sensors by using Equation 2 as follows:

$$\theta = \sin^{-1}(Xt_{norm}) \quad \text{[Equation 2]}$$

$$\phi = \sin^{-1}\left(\frac{Yt_{norm}}{\cos\theta}\right),$$

where, $Xt_{norm}$ denotes a normalized output value of the X-axis acceleration sensor, $Yt_{norm}$ denotes a normalized output value of the Y-axis acceleration sensor, θ denotes a pitch angle, and Φ denotes a roll angle.

The memory 150 stores a reference azimuth. Further, the voltage values of the X-axis and Y-axis fluxgates vary as the geomagnetic sensor 200 rotates in order for the pitch angle to increase 1° by 1° up to a certain range while maintaining the roll angle constant with respect to the pitch and roll angles measured by the rotation angle measurement part 160, and the memory 150 stores such varied values for every varied pitch angle.

Further, the controller 140 takes an arbitrary dip angle for a reference dip angle, and normalizes the output values of the X and Y axes of the two-axis fluxgate sensor 120 into output values in a certain range, and calculates a virtual normalized Z-axis output value by using the normalized output values of the X and Y axes. Next, the controller 140 calculates a comparison dip angle corresponding to the reference dip angle, calculates azimuths respectively corresponding to the reference and comparison dip angles, and selects a dip angle having the least error with respect to the reference azimuth. If the azimuth error at the selected dip angle is within a certain error range, the controller 140 sets the selected dip angle as a current dip angle and calculates azimuth.

More particularly, if a user rotates the geomagnetic sensor 200 in order that a pitch angle varies to a certain angle, for example, 1°, in a certain range while maintaining a roll angle, for example, 0°, constant, as above, the controller 140 measures and normalizes an output value of the geomagnetic field detection module 120 every time the pitch angle increases by 1° during the rotation, and stores the normalized output value in the memory 160. The range of pitch angles can be determined through experimental measurements, and the pitch angles preferably range from 0° to 70° in general. Further, the controller 140 arbitrarily takes a middle value of a certain pitch angle range for the reference dip angle, and normalizes the measured X-axis and Y-axis output values by use of Equation 3 as follows:

$$Xf_{norm} = \frac{2Xf - Xf_{max} - Xf_{min}}{(Xf_{max} - Xf_{min})} \times \cos\lambda \quad \text{[Equation 3]}$$

$$Yf_{norm} = \frac{2Yf - Yf_{max} - Yf_{min}}{Yf_{max} - Yf_{min}} \times \cos\lambda,$$

where, Xf denotes a voltage value of the X-axis fluxgate, Yf denotes a voltage value of the Y-axis fluxgate, $Xf_{max}$ and $Xf_{min}$ denote the maximum and minimum value of the Xf, respectively, $Yf_{max}$, and $Yf_{min}$, denote the maximum and minimum values of Yf, respectively, and λ denotes a dip angle.

Figure 3:
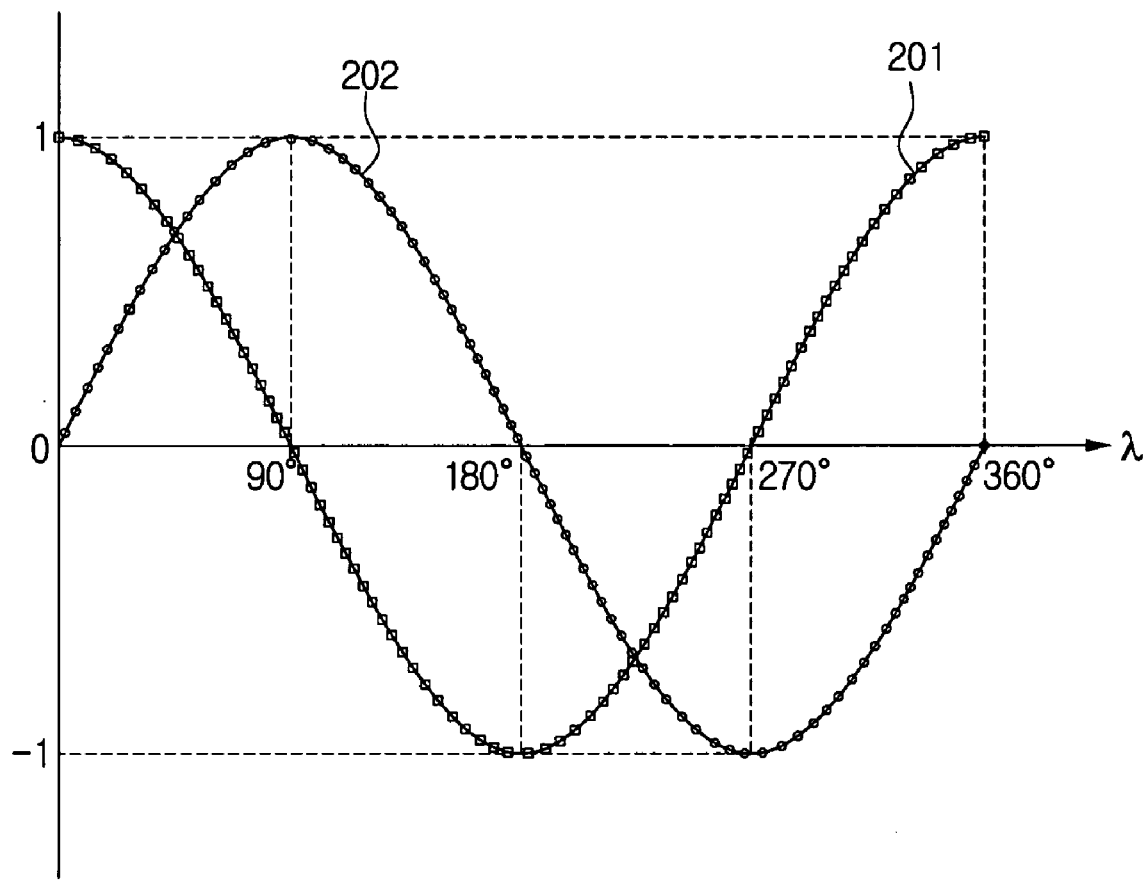
FIG. 3 is a graph for showing output values from axes of a two-axis fluxgate sensor of the geomagnetic sensor of FIG. 2.

FIG. 3 shows the normalized output values of the X-axis and Y-axis fluxgates by use of Equation 3. In FIG. 3, with respect to rotation angles, the voltage values 201 of the X-axis fluxgate appear as a form of cosine function, and the voltage values 202 of the Y-axis fluxgate appear as a form of sine function. FIG. 3 shows that the output values are normalized to a range from −1 to +1.

The memory 150 stores such normalized voltage values of the X-axis and Y-axis fluxgates, together with the pitch and roll angles.

Figure 4A:
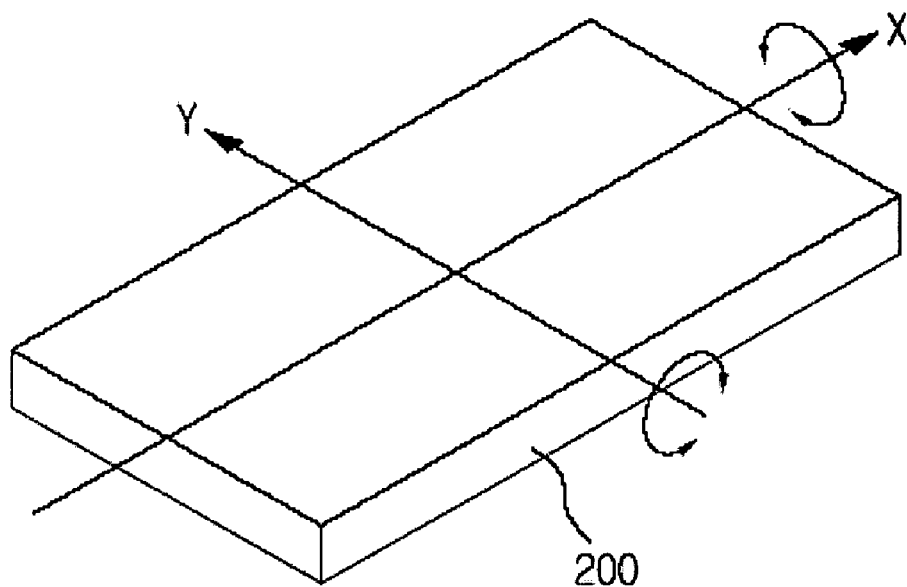
FIGS. 4A and 4B are views for showing pitch and roll angles formed by the geomagnetic sensor of FIG. 2.
Figure 4B:
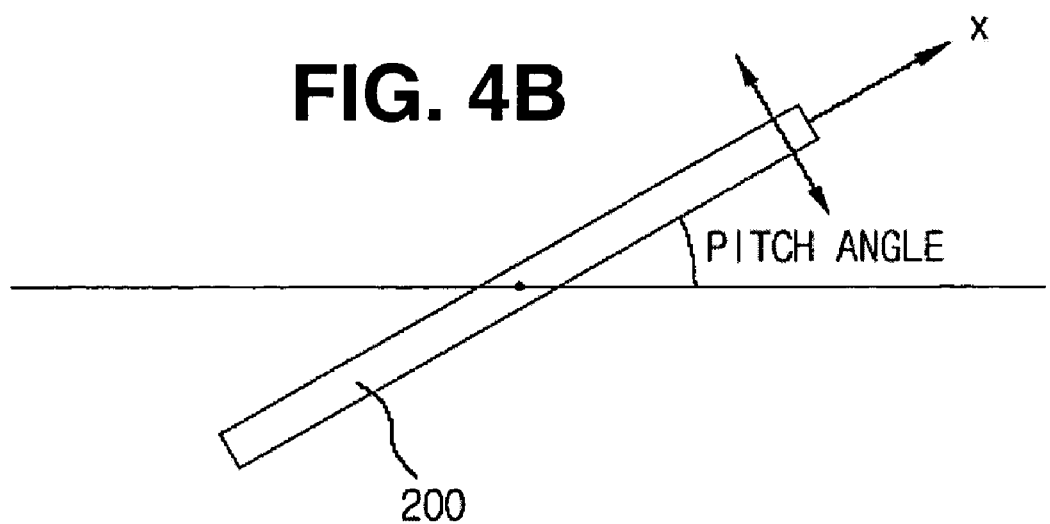

Further, FIG. 4A shows two axes (X and Y axes) perpendicular to each other on a plane on which the geomagnetic sensor 200 is placed, and FIG. 4B shows that the geomagnetic sensor 200 rotates in order for only the pitch angle to vary while maintaining the roll angle constant. That is, the geomagnetic sensor 200 rotates up and down with respect to the Y axis shown in FIG. 4A.

The azimuth is a value of the three-dimensional space expressed with three axes, so the output value of the Z axis is needed for the azimuth calculation process, wherein the Z axis is perpendicular to a plane formed by the X and Y axes. Such virtual normalized output value of the Z axis can be calculated by use of Equation 4 when the normalized output values of the X and Y axes, pitch angle, roll angle, and dip angle are used in Equation 4.

$$Zf_{norm} = \frac{(Xf_{norm} \times \sin\theta - Yf_{norm} \times \cos\theta \times \sin\phi + \sin\lambda)}{\cos\theta \times \cos\phi}, \quad \text{[Equation 4]}$$

where, Zf denotes a virtual voltage value of the Z axis, $Zf_{norm}$ denotes a normalized voltage value of the Z axis, λ denotes a dip angle, θ denotes a pitch angle, and Φ denotes a roll angle.

When the virtual normalized voltage value of the Z axis is calculated in the above process, azimut can be finally calculated by use of Equation 5 as follows:

$$\alpha = \tan^{-1}\left(\frac{Zf_{norm} \times \sin\phi - Yf_{norm} \times \cos\phi}{Xf_{norm} \times \cos\theta + Yf_{norm} \times \sin\theta \times \sin\phi + Zf_{norm} \times \sin\theta \times \cos\phi}\right), \quad \text{[Equation 5]}$$

where, a denotes an azimuth, $Xf_{norm}$, $Yf_{norm}$, and $Zf_{norm}$ denote the normalized output values of the X-axis, Y-axis, and Z-axis fluxgates, respectively, θ denotes a pitch angle, Φ denotes a roll angle, and λ denotes a dip angle.

Further, the controller 140 first estimates an arbitrarily established reference dip angle and a middle value of the maximum pitch angle as a comparison dip angle, and calculates azimuth by using the estimated comparison dip angle in Equations 3 to 5. At the same time, the controller 140 reads from the memory 150 and uses for the azimuth calculation the reference dip angle and a pitch angle, roll angle, and the normalized voltage values of the X-axis and Y-axis fluxgates that correspond to the comparison dip angle.

Next, the controller 140 compares the reference azimuth with the azimuth calculated based on the reference dip angle and the azimuth calculated based on the comparison dip angle, and detects a comparison error. The reference azimuth refers to azimuth measured in a horizontal state and stored in the memory 150.

The dip angle corresponding to a value having the least comparison error is set to a current dip angle. Further, if the comparison error of the current dip angle is within a certain error range, the current dip angle is finally determined. On the other hand, if the comparison error is beyond the certain error range, the currently set dip angle is re-estimated as a second reference dip angle, a second comparison dip angle is re-estimated accordingly, and the above process is repeated.

In the above circumstances, the second comparison dip angle is re-estimated to be a middle value between the second reference dip angle and the reference dip angle or the comparison dip angle that is not determined as the current dip angle. That is, if the reference dip angle is set to the current dip angle, the middle value between the current dip angle and the comparison dip angle is re-estimated as the second comparison dip angle. If the comparison dip angle is set to the current dip angle, a middle value between the current dip angle and the reference dip angle is re-estimated as the second comparison dip angle. Thus, azimuth errors are detected and compared again by using Equations 4 and 5, the second reference dip angle stored in the memory 150, pitch angle, roll angle, and normalized voltage values of the X-axis and Y-axis fluxgates that correspond to the second comparison dip angle, and the controller 140 checks again whether the least azimuth error is in the certain error range.

The controller 140 repeats such a process until the least azimuth error is within the certain error range, and, if the azimuth error is within the certain error range, the controller 140 finally sets the dip angle having such an error value to the current dip angle. The controller 140 calculates azimuth by using the current dip angle.

Further, in order to notify a user of the timing of such dip angle detection, the alarm part 170 can be further included according to anther embodiment of the present invention. If the controller 140 determines that at least one of the voltage values of the X and Y axes measured on the horizontal state has an error beyond the certain range with respect to the maximum and minimum reference voltage values stored in the memory 150, the controller 140 checks the number of times, and measures the voltage values of the X and Y axes to determine if there exists an error. The reference voltage values refer to the voltage values of the X and Y axes measured on the horizontal state by use of a precise dip angle.

If the number of times of such error occurrences is more than the predetermined number of times, the controller 140 has a dip angle checkup message displayed to notify of dip angle checkup through the alarm part 170.

Figure 5:
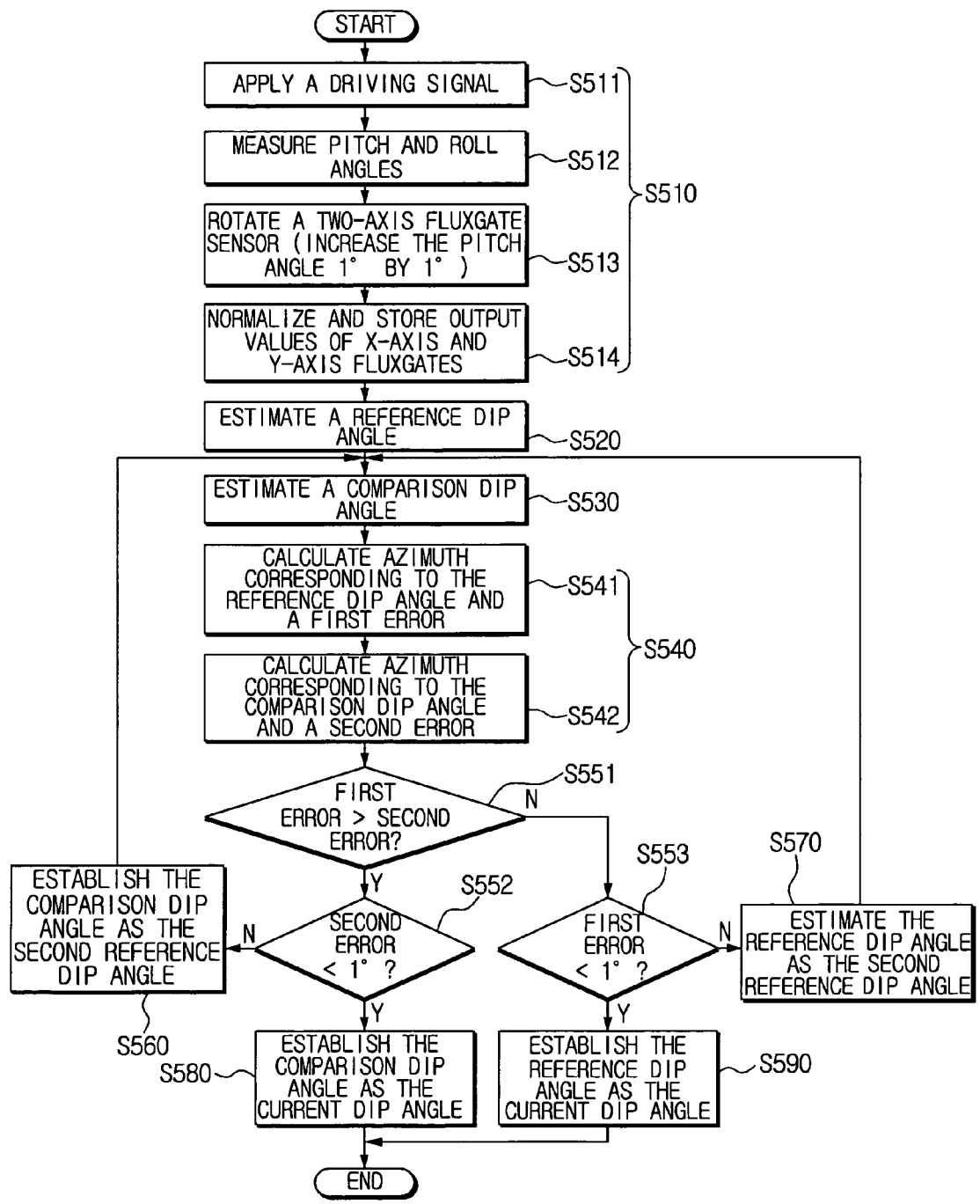
FIG. 5 is a flow chart for explaining a method detecting a dip angle formed by the geomagnetic sensor according to an embodiment of the present invention.

On the other hand, FIG. 5 is a flow chart for explaining a method of detecting a current dip angle by the geomagnetic sensor. In FIG. 5, the dip angle detection method according to the present invention includes a step (S510) of preparing for dip angle detection, steps (S520 and S530) of estimating a reference dip angle and a comparison dip angle, a step (S540) of calculating the reference dip angle, azimuth corresponding to the comparison dip angle, and an azimuth error, steps (S551, S552, and S553) of selecting one of the reference dip angle and comparison dip angle, steps (S560 and S570) of estimating a second reference dip angle, and steps (S580 and S590) of finally setting the current dip angle.

If a user activates the geomagnetic sensor 200 in order to estimate a dip angle (S511), the rotation angle measurement part 160 measures a pitch angle and a roll angle (S512). Such measurement is carried out by use of Equations 1 and 2 described above.

The user rotates the geomagnetic sensor 200 to increase the pitch angle 1° by 1° while maintaining the roll angle constant by use of the measured pitch angle and roll angle (S513). Since the X-axis and Y-axis fluxgates driven by a driving signal have different output values every time the pitch angle changes, the controller 140 measures, normalizes, and stores the different output values in the memory 150, together with the pitch and roll angles (S514). In this regard, the normalization can be carried out by use of Equation 3 described above.

Next, a middle value in a range of rotating pitch angles is first estimated as the reference dip angle (S520). That is, if the pitch angle is rotated in a range from 0° to 70°, the reference dip angle is estimated as 35°.

Next, one of the maximum pitch angle and minimum pitch angle and a middle value of the reference dip angles are estimated as comparison dip angles (S530).

Next, azimuth is calculated by use of the reference dip angle, and a difference or an error between the azimuth and the reference azimuth is calculated (S541). That is, a virtual normalized Z-axis output value is first calculated by use of Equation 4 described above, azimuth is calculated by use of the Z-axis output value and Equation 5 described above, the azimuth and the reference azimuth stored in the memory 150 are compared, and an error value (hereinafter, referred to a first error) is calculated.

Next, the same method as for the above reference dip angle is used to measure an azimuth error (hereinafter, referred to as a second error) by use of the estimated comparison dip angle (S542).

Next, the first and second errors are compared, and a relatively small error is selected (S551). If the first error is selected, the error value is checked to be in a predetermined error range (S553), and, if the first error is in the predetermined error range, a dip angle corresponding to the first error, that is, the reference dip angle, is finally set as a current dip angle (S590). If the first error is out of the predetermined error range, the reference dip angle is estimated as a second reference dip angle (S570), and the process is repeated from step S530. Further, a middle value between the second reference dip angle and either the reference dip angle or the comparison dip angle that is not determined as the current dip angle is re-estimated as a second comparison dip angle.

If the second error is selected, the second error is checked to be in the predetermined error range (S552), and, if the second error is in the predetermined error range, the comparison dip angle corresponding to the second error is finally set as the current dip angle (S580). If the second error is out of the predetermined error range, the comparison dip angle is estimated as the second reference dip angle (S560), and the process is repeated from step S530 by use of the second reference dip angle.

Detailed description will be made on how the geomagnetic sensor measures azimuth at a point of the current dip angle of 57°, for example. In particular, the assumption is made that the reference azimuth is 10° and an error range is 1°.

The user first rotates the geomagnetic sensor 1° by 1° to have a pitch angle range of 0° to 70° at the horizontal state, that is, the roll angle is maintained at 0°. At this time, the controller 140 measures, normalizes, and stores the voltage values of the X-axis and Y-axis fluxgates in the memory 150 together with pitch and roll angles.

Further, the controller 140 estimates the first reference dip angle to be 35°, that is, a middle value of 0° to 70°, and estimates the first comparison dip angle to 52°, that is, a middle value of 70° and 35°. In the present example, the middle value is estimated as the first comparison dip angle when the maximum pitch angle is 70°. The first comparison dip angle can be different depending on the position on the Earth, that is, the northern hemisphere or the southern hemisphere, where the geomagnetic sensor is used. That is, the middle value in case of the minimum pitch angle of 0° can be used as the first comparison dip angle on the southern hemisphere, and the middle value in case of the pitch angle of 70° can be used as the first comparison dip angle on the northern hemisphere.

Thus, the azimuth is calculated as 80° when the dip angle of 35° is used. Further, the azimuth is calculated in the above Equations 4 and 5 by use of the measured voltage values of the X-axis and Y-axis fluxgates read from the memory 150 when the pitch angle is 35° and the roll angle is 0°. Likewise, the azimuth calculated when the dip angle is 52° becomes about 14°.

Since the reference azimuth is 10°, azimuth of 52° causes an azimuth error of 4°, and azimuth of 35° causes the azimuth error of 70°. Further, of the two, the 52° is a relatively small error, but causes the azimuth error of 4°, so the azimuth error is out of the error range of 1°. Thus, the entire process is repeated with the second reference dip angle of 52°. That is, the second comparison dip angle is estimated to 62° that is a middle value of 52° and 70°, and the azimuth is calculated to about 30° when the values stored in the memory 150 are used. Here, the azimuth is calculated in the above Equations 4 and 5 by use of the measured voltage values of the X-axis and Y-axis fluxgates read from the memory 150 when the pitch angle is 62° and the roll angle is 0°. In the same method, the azimuth is calculated to about 14° when the dip angle is 52°.

Since the reference azimuth is 10°, the 52° value causes the azimuth error of 4°, and 62° causes the azimuth error of 20°. On the other hand, of the two, the 52° value is a relatively small error, but causes the azimuth error of 4°, so the azimuth error is out of the error range of 1°. Thus, the 52° value is again estimated as the third reference dip angle, and then the entire process is repeated.

That is, 56° value that is a middle value of the 62° value having been the comparison dip angle in the previous step, and the 52°, being the current reference dip angle, is re-estimated as the third comparison dip angle, and the azimuth error is calculated with the third comparison dip angle. Since the azimuth becomes 15° at 56°, the azimuth error becomes 5°. Thus, the azimuth error still remains smaller at 52°, the 52° value is re-estimated as the fourth reference dip angle, and then the whole process is repeated.

At this time, the fourth comparison dip angle is re-estimated as 54° being a middle value of 56° and 52°, and, when the azimuth error is calculated based on such re-estimation, the error less than 1° is calculated. Since the 54° value causes a smaller azimuth error compared to the 52° value, and has an error within the error range of 1°, so the 54° value is finally set as the current dip angle of the geomagnetic sensor.

By using the final dip angle, the controller 140 can precisely measure the azimuth even at a tilting posture.

Figure 6:
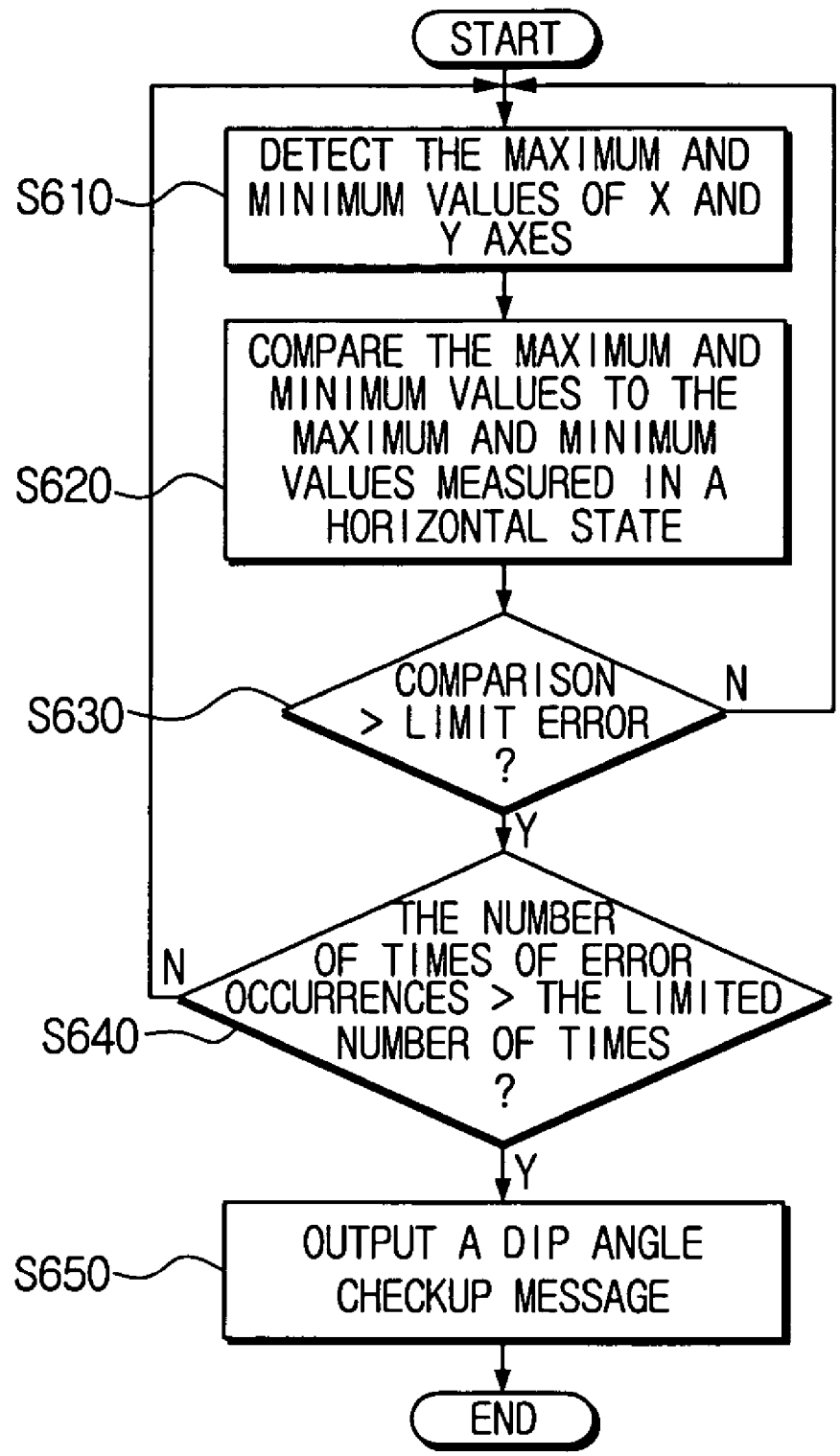
FIG. 6 is a flow chart for explaining a method by which a geomagnetic sensor notifies of dip angle compensation timing according to an embodiment of the present invention.

In the meantime, FIG. 6 is a flow chart for showing a process of notifying a user of the abnormality of the dip angle and outputting a message of asking the user whether to check the dip angle, according to an embodiment of the present invention. In FIG. 6, in a horizontal state maintained, the maximum and minimum voltage values of the X-axis and Y-axis fluxgates are detected by use of the current dip angle (S610). At this time, if measured in the horizontal state, the output value of the X axis has the maximum value when the azimuth is 0°, and the output value of the Y axis has the maximum value when the azimuth is 90°. Further, the output value of the X axis has the minimum value when the azimuth is 180°, and the Y axis has the minimum value when the azimuth is 270°. The output values of the X and Y axes are detected in the horizontal state since a user can most easily adjust a tilt angle of the geomagnetic sensor in the horizontal state. That is, the user places and activates the geomagnetic sensor on the flat table or earth, to thereby easily detect the output values of the X and Y axes in the horizontal state.

Next, the measured maximum and minimum values are compared to the maximum and minimum reference output values stored in the memory 150 (S620). The reference output values refer to the output values of the X and Y axes measured by use of a precise dip angle when the geomagnetic sensor is in the horizontal state. Thus, if the dip angle is not correct when measured in the same horizontal state, the error to the reference output value has to be measured very small.

As a result of a comparison, the comparison error to the reference output value is checked to determine whether it exceeds the predetermined limit error (S630), and, if exceeded, the number of times is checked whether to exceed the predetermined limit number of times (S640). The limit error and the limit number of times are values determined by designer's intention and stored in the memory 150.

If the limit number of times is not exceeded, the maximum and minimum values are again measured, and the step of checking an error is repeated. If the limit number of times is exceeded, a dip angle checkup message is displayed through the alarm part 170 (S650).

Thus, the user is notified that it is needed to compensate for the dip angle, and detects the dip angle according to the above process.

As aforementioned, the present invention enables one to measure the current dip angle in a simple method even when the geomagnetic sensor is in a tilted state so that geomagnetic azimuth is properly outputted.

Further, the timing to check the dip angle is notified so that a user can actively check the dip angle.

The foregoing embodiments and advantages are merely exemplary and are not to be construed as limiting the present invention. The present teaching can be readily applied to other types of apparatuses. Also, the description of the embodiments of the present invention is intended to be illustrative, and not intended to limit the scope of the claims, and many alternatives, modifications, and variations will be apparent to those skilled in the art.

What is claimed is:

1. A geomagnetic sensor, comprising:
   a main body;
   a rotation angle measurement part that measures pitch and roll angles of the main body with respect to the surface of the Earth;
   a geomagnetic measurement module that outputs an electric signal corresponding to the geomagnetic field;
   a memory that stores predetermined reference azimuths and output values of the geomagnetic measurement module corresponding to changes of the pitch and roll angles; and
   a controller that calculates azimuths by use of the output values of the geomagnetic measurement module, the pitch and roll angles, and predetermined dip angles, wherein the controller establishes at least two dip angles, calculates the azimuth for each dip angle, compares the azimuth to the reference azimuth, and determines a dip angle at the azimuth having a smaller azimuth error as a current dip angle.

2. The geomagnetic sensor as claimed in claim 1, wherein the controller estimates as a reference dip angle a middle value of a pitch angle variation range in case that the pitch angle varies, estimates as a comparison dip angle a middle value between the reference dip angle and one of maximum and minimum values of the pitch angle variation range, and determines as the current dip angle either the reference dip angle or the comparison dip angle based on which azimuth results in a smaller azimuth error.

3. The geomagnetic sensor as claimed in claim 2, wherein the controller re-estimates the current dip angle as a second reference dip angle if an azimuth calculated based on the current dip angle has an azimuth error beyond a certain error range, re-estimates as a second comparison dip angle a middle value of the second reference dip angle and either the reference dip angle or the comparison dip angle that is not determined as the current dip angle.

4. The geomagnetic sensor as claimed in claim 1, wherein the rotation angle measurement part includes X-axis and Y-axis acceleration sensors perpendicular to each other, and the controller normalizes voltage values measured by the X-axis and Y-axis acceleration sensors into values in a certain range, and calculates the pitch and roll angles by use of following Equations:

$$\theta = \sin^{-1}(Xt_{norm})$$
$$\phi = \sin^{-1}\left(\frac{Yt_{norm}}{\cos\theta}\right),$$

where, $Xt_{norm}$ denotes a normalized output value of the X-axis acceleration sensor, $Yt_{norm}$ denotes a normalized output value of the Y-axis acceleration sensor, $\theta$ denotes a pitch angle, and $\Phi$ denotes a roll angle.

5. The geomagnetic sensor as claimed in claim 1, wherein the geomagnetic measurement module is a two-axis fluxgate sensor having X-axis and Y-axis fluxgates perpendicular to each other and outputting an electric signal of each of the X-axis and Y-axis fluxgates corresponding to a magnetic field generated by a certain driving signal.

6. The geomagnetic sensor as claimed in claim 5, further comprising:
a driving signal generation part that generates and applies the driving signal to the geomagnetic measurement module; and
a signal processing part that converts the electric signals of the geomagnetic measurement module into voltage values of the X-axis and Y-axis fluxgates for outputs.

7. The geomagnetic sensor as claimed in claim 6, wherein the controller measures the voltage values of the X-axis and Y-axis fluxgates every time the pitch angle increases if the geomagnetic sensor rotates in order for the pitch angle to increase by an increase angle in a predetermined range at a fixed roll angle, normalizes the voltage values into values in a predetermined range, and stores the normalized voltage values in the memory.

8. The geomagnetic sensor as claimed in claim 7, wherein the controller calculates a voltage value of a virtual Z-axis fluxgate perpendicular to a plane formed by the X-axis and Y-axis fluxgates by use of following Equation, and calculates azimuth:

$$\alpha = \tan^{-1}\left(\frac{Zf_{norm} \times \sin\phi - Yf_{norm} \times \cos\phi}{Xf_{norm} \times \cos\theta + Yf_{norm} \times \sin\theta \times \sin\phi + Zf_{norm} \times \sin\theta \times \cos\phi}\right)$$

$$Zf_{norm} = \frac{Xf_{norm} \times \sin\theta - Yf_{norm} \times \cos\theta \times \sin\phi + \sin\lambda}{\cos\theta \times \cos\phi},$$

where, $\alpha$ denotes azimuth, $Xf_{norm}$, $Yf_{norm}$, and $Zf_{norm}$ denote normalized output values of X-axis, Y-axis, and Z-axis fluxgates, respectively, Zf denotes a voltage value of a virtual Z axis, $\theta$ denotes a pitch angle, $\Phi$ denotes a roll angle, and $\lambda$ denotes a dip angle.

9. The geomagnetic sensor as claimed in claim 6, further comprising an alarm part that displays a predetermined dip angle checkup message, and the controller checks the voltage values of the X-axis and Y-axis fluxgates measured in a horizontal state, compares the voltage values to a predetermined reference voltage value stored in the memory, checks the number of times that an error to the reference voltage value exceeds a predetermined limit error range, and controls the alarm part to display the dip angle checkup message if the number of times the reference voltage exceeds the predetermined limit error range is more than the predetermined number of times.

10. A dip angle detection method for a geomagnetic sensor, comprising:
(a) measuring pitch and roll angles of the geomagnetic sensor with respect to the surface of the Earth;
(b) detecting output values corresponding to a geomagnetic field from X-axis and Y-axis fluxgates perpendicular to each other;
(c) establishing at least two dip angles;
(d) calculating azimuth corresponding to each of the at least two dip angles by use of the output values and pitch and roll angles; and
(e) comparing a reference azimuth to the azimuth calculated at each of the at least two dip angles, and determining as a current dip angle a dip angle corresponding to the azimuth having a smaller azimuth error with respect to the reference azimuth.

11. The dip angle detection method as claimed in claim 10, wherein step (c) includes:
establishing as a reference dip angle a middle value of a pitch angle variation range in case that the pitch angle varies; and
establishing as a comparison dip angle a middle value between the reference dip angle and one of maximum and minimum values of the pitch angle variation range.

12. The dip angle detection method as claimed in claim 11, wherein step (e) comprises determining, as the current dip angle, either the reference dip angle or the comparison dip angle based on which azimuth has a smaller azimuth error with respect to the reference azimuth.

13. The dip angle detection method as claimed in claim 12, further comprising:
determining whether an azimuth calculated based on the current dip angle has an azimuth error out of a certain error range;
re-estimating the current dip angle as a second reference dip angle if the azimuth error is beyond the certain error range, and
re-estimating as a second comparison dip angle a middle value of the second reference dip angle and either the reference dip angle or the comparison dip angle that is not determined as the current dip angle, and repeating steps (c) to (e).

14. The dip angle detection method as claimed in claim 13, wherein step (a) includes:
(a1) normalizing voltage values measured by X-axis and Y-axis fluxgates perpendicular to each other into values in a certain range, and
(a2) calculating the pitch and roll angles by use of the normalized voltage values and following Equations:

$$\theta = \sin^{-1}(Xt_{norm})$$

$$\phi = \sin^{-1}\left(\frac{Yt_{norm}}{\cos\theta}\right),$$

where, $Xt_{norm}$ denotes a normalized output value of the X-axis fluxgate, $Yt_{norm}$ denotes a normalized output value of the Y-axis fluxgate, $\theta$ denotes a pitch angle, and $\Phi$ denotes a roll angle.

15. The dip angle detection method as claimed in claim 13, wherein step (b) includes:
applying a predetermined driving signal to the X-axis and Y-axis fluxgates;
detecting electric signals of the X-axis and Y-axis fluxgates corresponding to a magnetic field generated by the driving signal; and
converting the electric signals into voltage values of the X-axis and Y-axis fluxgates for outputs.

16. The dip angle detection method as claimed in claim 15, further comprising:
rotating the geomagnetic sensor in order for the pitch angle to increase by a certain angle in a predetermined range at a fixed roll angle;
measuring the voltage values of the X-axis and Y-axis fluxgates every time the pitch angle increases, and normalizing the voltage values into values in a certain range; and
storing the normalized voltage values of the X-axis and Y-axis fluxgates.

17. The dip angle detection method as claimed in claim 16, wherein step (b) comprises normalizing, into values in a predetermined range, a voltage value of a virtual Z-axis fluxgate perpendicular to a plane formed by the X-axis and Y-axis fluxgates by use of following Equation, and calculating azimuth:

$$\alpha = \tan^{-1}\left(\frac{Zf_{norm} \times \sin\phi - Yf_{norm} \times \cos\phi}{Xf_{norm} \times \cos\theta + Yf_{norm} \times \sin\theta \times \sin\phi + Zf_{norm} \times \sin\theta \times \cos\phi}\right)$$

$$Zf_{norm} = \frac{Xf_{norm} \times \sin\theta - Yf_{norm} \times \cos\theta \times \sin\phi + \sin\lambda}{\cos\theta \times \cos\phi},$$

where, $\alpha$ denotes azimuth, $Xf_{norm}$, $Yf_{norm}$, and $Zf_{norm}$ denote normalized output values of X-axis, Y-axis, and Z-axis fluxgates, respectively, $Zf$ denotes a voltage value of a virtual Z axis, $\theta$ denotes a pitch angle, $\Phi$ denotes a roll angle, and $\lambda$ denotes a dip angle.

18. The dip angle detection method as claimed in claim 10, further comprising:
checking the voltage values of the X-axis and Y-axis fluxgates measured in a horizontal state;
comparing the voltage values to a predetermined reference voltage value;
checking the number of times that a comparison error to the reference voltage value exceeds a predetermined limit error range; and
displaying a predetermined dip angle checkup message notifying that the current dip angle is in error if the number of times the limit error range is exceeded is more than the predetermined number of times.

* * * * *